US007685627B2

(12) United States Patent
Joubert et al.

(10) Patent No.: US 7,685,627 B2
(45) Date of Patent: Mar. 23, 2010

(54) UNIFIED NETWORKING DIAGNOSTICS

(75) Inventors: Philippe A. Joubert, Bellevue, WA (US); Fabien J. Royer, Redmond, WA (US); Mark Vayman, Redmond, WA (US); Eran Yariv, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1087 days.

(21) Appl. No.: 11/323,341

(22) Filed: Dec. 30, 2005

(65) Prior Publication Data

US 2007/0157312 A1 Jul. 5, 2007

(51) Int. Cl.
*G06F 21/00* (2006.01)

(52) U.S. Cl. ............................................ 726/1; 726/22

(58) Field of Classification Search ..................... 726/1, 726/11, 21–23; 713/166, 200, 153, 201; 709/223, 225, 232

See application file for complete search history.

(56) References Cited

U.S. PATENT DOCUMENTS 6,453,345 B2 * 9/2002 Trcka et al. ................. 709/224
2003/0135603 A1 * 7/2003 Lin ............................ 709/223
2006/0174336 A1 * 8/2006 Chen ........................... 726/11

OTHER PUBLICATIONS

Markham et al., "Security at the Network Edge: A Distributed Firewall Architecture", IEEE, pp. 279-286, 2001.*
Jakobson, Gabriel, "The Technology and Practice of Integrated Multi-Agent Event Correlation Systems", KIMAS 2003 Boston, pp. 568-573, Oct. 1-3, 2003.*
SSH, "VPN Connection to Cisco VPN 3000 Concentrator", pp. 1-11, http://www.cyprotect.com/ssh/sentinel/SSH-Sentinel-1.4-CiscoConcentrator.pdf, Oct. 28, 2002.*

* cited by examiner

*Primary Examiner*—Carl Colin
*Assistant Examiner*—Hee Song
(74) *Attorney, Agent, or Firm*—Perkins Coie LLP

(57) ABSTRACT

A method and system for unified diagnosis of a network incident is provided. The unified diagnostics system is comprised of a monitoring tool, a network layer including a firewall, and a policy engine. The monitoring tool is invoked by a user in order to diagnose a network incident. The network layer and the policy engine generate various events that provide a history of their processing, and the monitoring tool collects these events. When the user attempts a network activity that fails, the network layer places an event notification in a notification queue. Then the monitoring tool analyzes the event notifications to identify events that are related to the same network incident. After analyzing the network incident and event information, the user can take the necessary action to correct the problem that caused the incident.

15 Claims, 6 Drawing Sheets

650

Firewall Rules

| Condition | Action |
|---|---|
| Dest. Port = 80 | Discard Packet (Filter ID) |
| Dest. Port = 80 | Log Event (Process ID, Filter ID, Src Address) |
| | |

UNIFIED NETWORKING DIAGNOSTICS

BACKGROUND

Early Internet networking protocols were designed to facilitate communication between network devices through an open exchange of data. As more and more network devices were connected to the Internet, the use of network devices for malicious attacks increased. Such malicious attacks include theft of data, Denial of Service (DOS) attacks, the proliferation of computer viruses, and the like. Protocols and firewalls were developed that allowed defining a network security policy that would block malicious network traffic, while continuing to allow other network traffic. However, the increasing complexity of a typical network layer including security policies makes it difficult to diagnose the cause of an incorrectly denied network access attempt.

Various methods have been developed to protect network devices against malicious attacks, usually through implementation of one or more network policies. One network policy is a security policy such as provided for by the Internet Protocol Security (IPSec) suite. The IPSec suite provides protocols such as Encapsulating Security Protocol (ESP), Authentication Header (AH), and Internet Key Exchange and Management (IKE). The ESP protocol, documented in Internet Engineering Task Force (IETF) Request for Comments (RFC) 2406, is an authenticating and encrypting protocol that uses cryptographic mechanisms to provide integrity, source authentication, and confidentiality of data. The AH protocol, documented in IETF RFC 2402, is an authentication protocol that uses a hash signature in the packet header to validate the integrity of the packet data and authenticity of the sender.

The IKE protocol, documented in IETF RFC 2409, provides a method for network devices to negotiate security settings used with the AH and ESP protocols. The negotiated security settings form a data structure called a security association (SA). The SA defines parameters, such as the authentication algorithm, encryption algorithm, cryptographic keys, and the lifetime of keys, used by the ESP or AH protocol to protect the contents of the IP packet. Because the ESP and AH protocols require an established SA, an IKE negotiation is executed before the ESP or AH protocols are used to transmit data.

A network device identifies packets that are subject to IPSec (e.g., IKE, AH, or ESP protocols) processing and the manner that such packets should be processed based on a security policy maintained in a Security Policy Database (SPD). The security policy is a set of rules assigned to the network layer that defines how to apply IPSec. The security policy includes filter lists, authentication methods, and other information. The proper security policy to be applied to a packet is usually determined based upon the packet's source and destination IP address, source and destination port, and protocol type.

Another network policy used to protect against malicious attacks is a firewall policy. The firewall policy is implemented by one or more filters. Each filter includes filter parameters and an associated policy to be applied to packets that match the filter parameters. The filter parameters include information such as hardware addresses (e.g., Media Access Control (MAC) addresses), network addresses (e.g., IP addresses), protocol type (e.g., Transport Control Protocol (TCP)), port numbers, and the like. The firewall policy of a filter identifies how packets with parameters that match the filter parameters should be treated. For example, a filter may indicate that packets with a certain IP address should be dropped. Whenever the network device examines a packet and through that examination identifies a packet destined to that IP address, the network device drops the packet to prevent it from traversing the network.

Network devices also use non-security related policies to control the flow of network traffic. As one example, network devices implement a Quality of Service (QoS) based policy. QoS addresses the fact that transmission rates, error rates, and other characteristics can be measured, improved, and to some extent guaranteed in advance. Packets can be expedited based on policy and reservation criteria. QoS is used, for example, to allocate network bandwidth for improved communications between network devices.

The proliferation of policies for securing a network device has made it difficult to diagnose network incidents. Each of the policy components typically has its own method of logging diagnostic information, and logged information from each component is typically missing information relevant to a complete diagnosis of a particular network incident. Moreover, once the cause of a failure is known, it is typically a significant task to relate the cause back to a particular policy that needs to be modified to prevent the failure.

SUMMARY

A method and system for unified diagnosis of a network incident is provided. In some embodiments, the unified diagnostics system is comprised of a monitoring tool, a network layer including a firewall, and a policy engine. The monitoring tool is invoked by a user in order to diagnose a network incident. The network layer and the policy engine generate various events that provide a history of their processing, and the monitoring tool collects these events upon starting up as well as events that occur while the tool is running. When a network incident occurs (e.g., a network access failure), the network layer places various event notifications in the notification queue. Then the monitoring tool analyzes the event notifications to identify which events are related to the network incident. After analyzing the network incident and the related event notifications, the user can take the necessary action to correct the problem that caused the incident.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 is a table showing a set of firewall rules in one embodiment.

DETAILED DESCRIPTION

Figure 1:
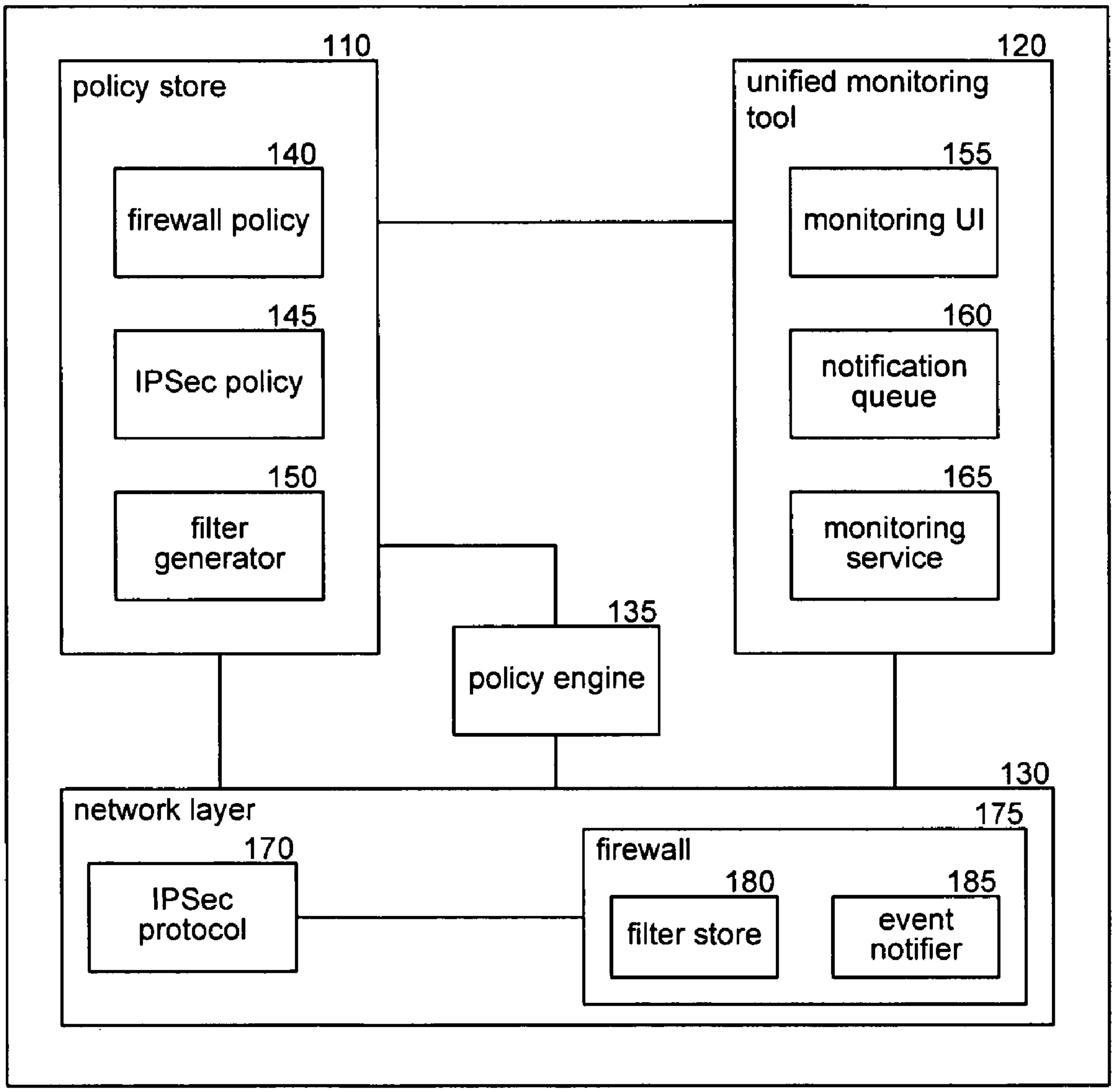
FIG. 1 is a block diagram that illustrates components of the unified diagnostics system in one embodiment.

A method and system for unified diagnosis of a network incident is provided. In some embodiments, the unified diagnostics system is comprised of a monitoring tool, a network layer including a firewall, and a policy engine. The monitoring tool is invoked by a user in order to diagnose a network incident. For example, if the user has attempted to connect to a particular web page and the request was denied, the user can start the monitoring tool to collect information about the incident. The network layer and the policy engine may generate various events that provide a history of their processing, and the monitoring tool collects these events upon starting up. The monitoring tool may also enable enhanced diagnostic capabilities within the network layer and the policy engine, and request that the user re-attempt the activity that led to the network incident. The network layer and policy engine with the enhanced diagnostic capabilities will generate additional events leading up to the attempted activity that may again fail. For example, the monitoring tool may enable the network layer to send an event notification when a packet is dropped. When the user again attempts to connect to the web page and fails, the network layer places event notifications relating to the attempt in a notification queue. Then the monitoring tool analyzes the event notifications to identify events that are related to the same network incident. For example, if the network access used the IPSec protocol and the failure was caused by an expired certificate, then the network layer may place both a policy engine event related to the expired certificate and a network layer event related to the denial of access in the notification queue. The monitoring tool would report a single network incident to the user including information from each of the events that were identified. After analyzing the network incident and event notifications, the user can take the necessary action to correct the problem that caused the incident. For example, the monitoring tool may identify that the user attempted to visit a particular website and that the request was denied due to an expired certificate. The user could then use this information to correct the problem by updating the certificate so that the user could successfully visit the website in the future.

In some embodiments, the unified diagnostic system utilizes a policy store containing multiple network policies in a common schema to enable more detailed diagnostic information. By storing policies in a common schema, the unified diagnostics system is able to retrieve detailed information about a policy identified by an event without a special understanding of the component that the policy relates to. For example, by storing both firewall and IPSec policies in a common schema, the monitoring tool can retrieve information about an event that refers to a policy without having to understand the different purposes and implementations of the IPSec and firewall components. A method of integrating network policies has been described in U.S. Patent Publication 2005/0010765 entitled "Method and Framework for Integrating a Plurality of Network Policies," which is hereby incorporated by reference in its entirety. In the described system, network policies from the policy store are converted to a series of filters and then installed in a policy engine. A method of automatically generating filters has been described in U.S. Application Ser. No. 11/183,317 entitled "Automatically Generating Rules for Connection Security," which is hereby incorporated by reference in its entirety. When network packets arrive, the filters trigger a request to the policy engine to identify an appropriate policy to apply to each packet. For example, a network policy may specify that port 80 should be blocked from 5 P.M. until 8 A.M. each day. The filter generator may generate a filter that is triggered by network packets arriving with a destination port equal to 80. When the filter is triggered, the network layer invokes the policy engine to determine if the packet should be allowed or blocked. If the time of day is outside of the blocked time period, the policy engine will inform the network layer to allow the packet, and the network layer will deliver the packet.

In some embodiments, the unified diagnostics system utilizes a monitoring tool that contains a monitoring user interface, a notification queue, and a monitoring service. The monitoring user interface receives information from the user about the types of incidents that the user is interested in monitoring. For example, if the user was unable to access a web page, the user might inform the monitoring tool to look only for failures related to the user's web browser. The monitoring service collects and correlates events related to network incidents and places relevant event notifications into the notification queue. For example, the monitoring service may receive event notifications from a network layer indicating that certain packets have been discarded, or from a policy engine indicating that a user's credentials could not be validated. The notification queue is used to store identified network incidents and to capture event notifications generated by other layers of the system. The monitoring user interface retrieves identified network incidents from the notification queue and displays incidents whose types match the types of incidents that the user indicated an interest in monitoring.

In some embodiments, the unified diagnostics system uses a firewall that allows both policy enforcement and event monitoring through the overloading of firewall rules. A typical firewall applies rules that specify when the firewall should take special action, for example, by invoking a policy engine. A rule typically contains a condition to which the rule applies and an action to be performed when the condition is met (such as blocking the packet). For example, one rule might instruct the firewall to discard packets that have a destination port of 80 (the port typically used by HTTP for web browsing). The firewall used by the unified diagnostics system can also apply rules with an action that indicates that an event notification should be generated. For example, in addition to the rule mentioned previously, which discards packets when the destination port is 80, the unified diagnostics system can add a second rule to the firewall that records a packet drop event when a packet with a destination port of 80 is identified. The event notification may include information useful for diagnostics such as the address of the sender of the packet, an identifier of the filter that caused the packet to be discarded, and an identifier of the process that made the network request.

In some embodiments, the unified diagnostics system uses a networking layer that is tightly linked with the policy engine. The components can be tightly linked by increasing the information that the networking layer has about the policies that it enforces. For example, the policy engine can inform the network layer of an identifier for the filter or rule that produced a particular decision about whether a packet should be allowed or dropped. Through this tight linkage, the networking layer is able to report more detailed event notifications about the policies that are implicated by a particular network incident. The increased detail in the event notifications makes it easier to identify related events and therefore allows the monitoring tool to give the user more detailed information about the cause of a network incident.

In some embodiments, the unified diagnostics system collects events from several types of event sources. One source of event information is the event log provided by the operating system. Another source of event information is logging provided by the network stack, for example, through notification rules added to a firewall that allows event monitoring like the one described above. Another source of information is the operating system's list of running processes that includes process identifiers and process names. The monitoring service can translate process identifiers contained in events from other sources into easily readable process names for display to a user. Another source of information is the policy engine that includes policy identifiers and policy names, which can be used to translate policy identifiers contained in events into human-readable policy names.

In some embodiments, the unified diagnostics system uses a publisher/subscriber model to collect events. In this model, event sources are considered to publish information to interested subscribers. Each component of the system can publish information when potentially interesting events occur. The monitoring tool can subscribe to any of the event sources and receive events published by the sources. Such a model allows new event sources to be easily added without substantial changes being required to other components in order to understand the new events.

In some embodiments, the unified diagnostics system allows the user to define filters for the events that the monitoring tool will operate on. Filtering of events can minimize the performance impact of running a diagnostic tool as well as reduce the amount of unrelated information that the user has to read through. For example, if the user is diagnosing a failure to connect to a particular web page using the Internet Explorer web browser, the user can add a filter indicating that only events relating to the process iexplore.exe (the name of the process for Internet Explorer) should be logged. This prevents the user from seeing events from unrelated network incidents.

In some embodiments, the unified diagnostics system correlates events using time proximity of the events. For example, the system may define that events that occur within several seconds of each other are related.

In some embodiments, the unified diagnostics system correlates events using identifiers contained within the events. For example, a security event related to an expired certificate may contain a certificate identifier that the system can use to look up additional information about the certificate. If the certificate relates to a particular website, the additional information may allow the system to correlate the security event with networking events that identify that website. As another example, a networking event may contain an identifier of the process that made a failed attempt to access a network device. The system can use this process identifier to find other events related to the same process, as well as to look up a friendly name for the process that can be presented to the user.

In some embodiments, the unified diagnostics system correlates events using fuzzy matching. Rather than requiring that two events be correlated by an exact match of some parameter within the events, fuzzy matching allows the parameters to differ by a certain amount and still correlate the events. For example, two events may have occurred at different times, but within a couple of seconds of each other, and the system will identify the two events as being related to the same network incident.

In some embodiments, the unified diagnostics system allows diagnosing failures that occurred while the monitoring tool was not running. The system may have less information about failures that occur while a full set of diagnostics events is set up within the firewall and other layers. However, the system may still have enough information to present a helpful description of a failure to the user by inspecting logs from event sources that were available when the failure occurred.

In some embodiments, the unified diagnostics system collects events from network devices other than the network device on which the monitoring tool is run. For example, the system may query a router or network address translator (NAT) attached to the network for events. The system may also query other computers on the network that contain events relevant to diagnosing a network incident. For example, a domain controller may have information related to a user's security permissions or other information relevant to diagnosing a network incident.

FIG. 1 is a block diagram that illustrates components of the unified diagnostics system in one embodiment. The system contains a policy store component 110, a unified monitoring tool 120, a network layer 130, and a policy engine 135. The policy store 110 contains policies for protocols such as IPSec 145 and a firewall 140. The policy store 110 may also contain a filter generator 150 for converting policies into filters used by the policy engine 135 to enforce the policies in the policy store 110. The unified monitoring tool 120 contains a monitoring user interface 155, a notification queue 160, and a monitoring service 165. The network layer 130 contains a firewall 175 and components that implement various protocols, such as an IPSec protocol 170 (as well as other common protocols such as Transmission Control Protocol (TCP) and the Internet Key Exchange and Management Protocol (IKE)). The firewall 175 interacts with the policy engine 135 to enforce networking policies defined in the policy store 110, and may also provide notifications to the unified monitoring tool 120 when events occur. The firewall 175 contains a filter store 180 that stores the filter conditions that trigger the firewall 175 to invoke the policy engine 135 to determine the policy to apply to a particular network packet. The firewall 175 also contains an event notifier 185, which notifies the unified monitoring tool 120 when a filter condition occurs that indicates that a notification should be generated. The unified monitoring tool 120 is run by a user to diagnose a network incident.

The computing device on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
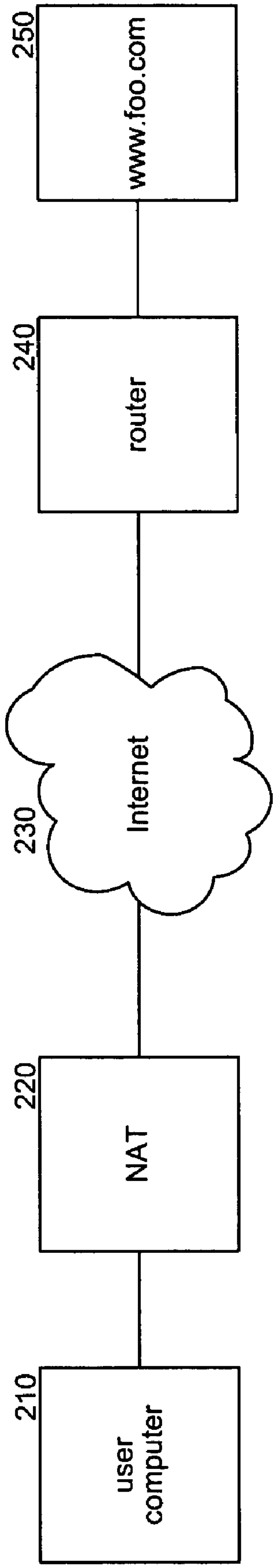
FIG. 2 is a block diagram that illustrates the environment in which the system is used in one embodiment.

FIG. 2 is a block diagram that illustrates the environment in which the system is used in one embodiment. The environment contains a user computer 210, which is connected to a NAT 220. The NAT 220 provides the user computer 210 with access to the Internet 230. A router 240, also connected to the Internet 230, routes traffic to a web server 250 for the site www.foo.com. The unified diagnostic system runs on the user computer 210 and may be used to diagnose a failure to connect to the www.foo.com web server 250. The system may query information from the NAT 220 or any other network device.

Figure 3:
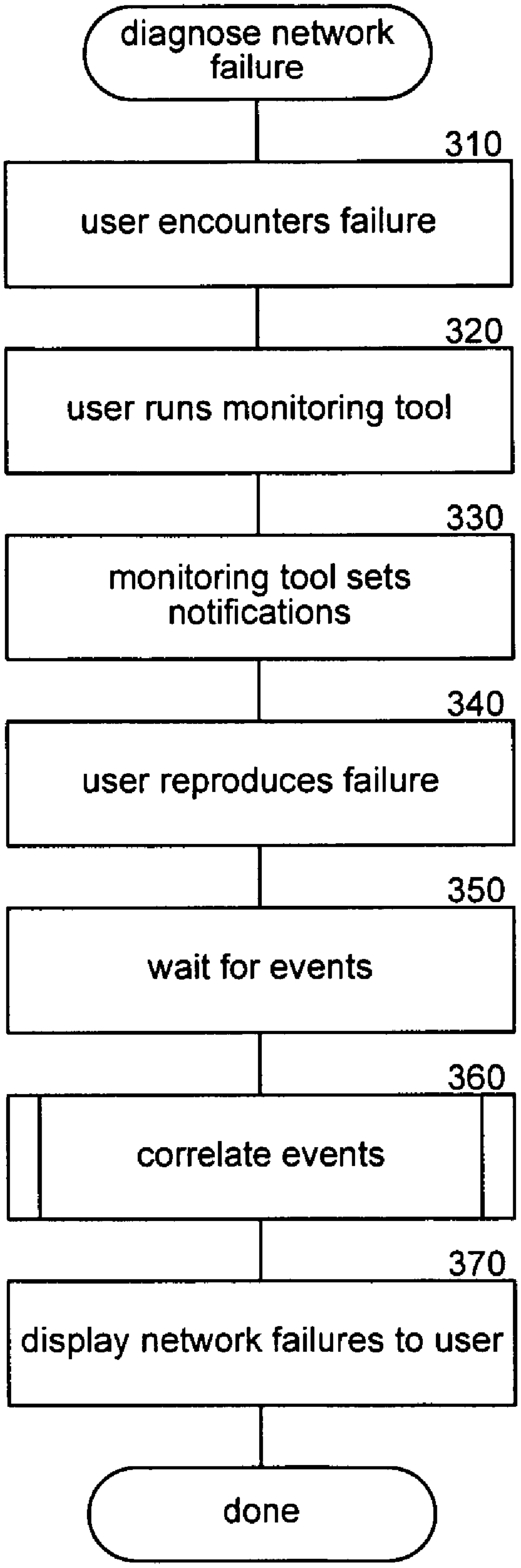
FIG. 3 is a flow diagram that illustrates the use of the monitoring tool to diagnose a network incident in one embodiment.

FIG. 3 is a flow diagram that illustrates the use of the monitoring tool to diagnose a network incident in one embodiment. In block 310, the user encounters a network incident. In block 320, the user runs the monitoring tool. In block 330, the monitoring tool sets up notifications in the networking layer, policy engine, or other components that need to be configured to produce events. In block 340, the user reproduces the network incident while the monitoring tool is running. In block 350, the monitoring tool watches for event notifications related to the network incident. In block 360, the monitoring tool correlates events from various sources and identifies events related to the same network incident. In block 370, the monitoring tool displays a list of network incidents to the user with information from the various events. The system then completes.

Figure 4:
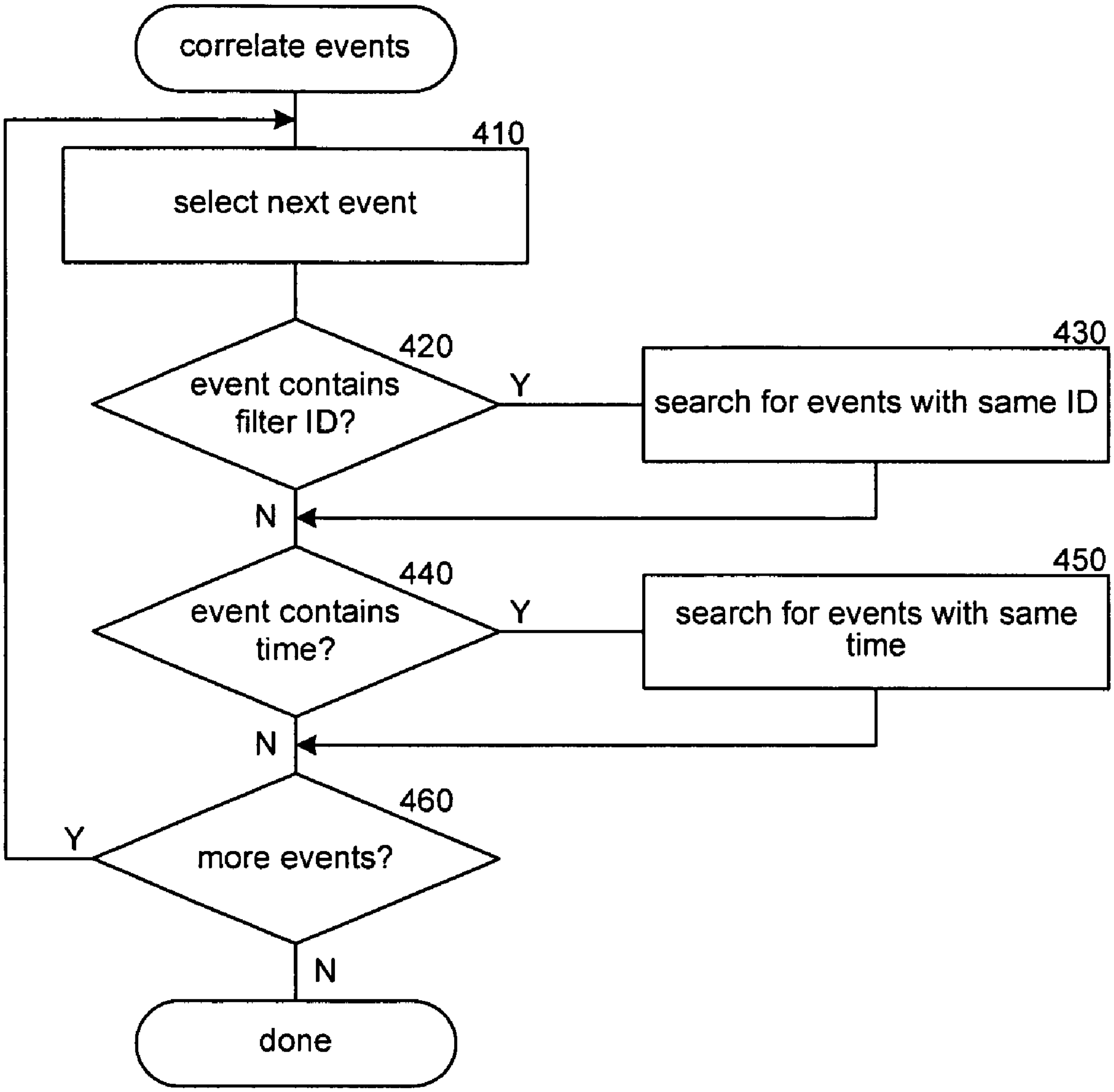
FIG. 4 is a flow diagram that illustrates the processing of the monitoring tool to correlate events in one embodiment.

FIG. 4 is a flow diagram that illustrates the processing of the monitoring tool component to correlate events in one embodiment. In block 410, the component selects the next event from a particular event source. In decision block 420, if the event contains a filter ID identifying the policy that led to the event, the component continues at block 430, else the component continues at block 440. In block 430, the component searches for other events that contain the same filter ID as the selected event and adds any matching events to a list of related events. In decision block 440, if the event contains a time at which the event occurred, the component continues at block 450, else the component continues at block 460. In block 450, the component searches for other events that occurred around the same time and adds any matching events to a list of related events. The component continues in this way adding related events based on a variety of criteria. The component may also require that multiple criteria match before the event is added to the list of related events. For example, an event may have to have occurred around the same time and contain a matching filter ID to be considered related to the selected event. In decision block 460, if there are more events, the component loops to block 410 to select the next event, else the component completes.

Figure 5:
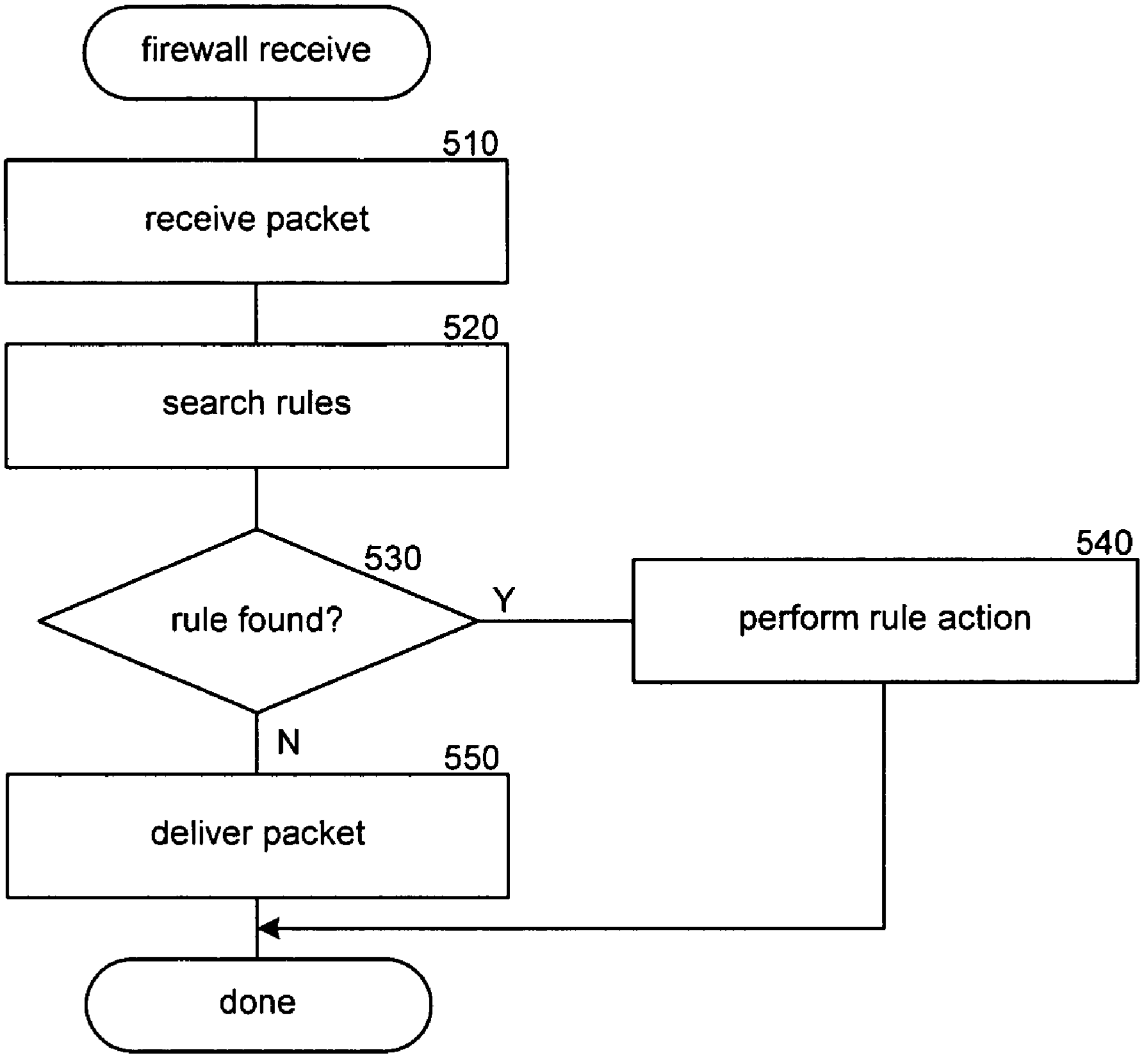
FIG. 5 is a flow diagram that illustrates the processing of the firewall component in one embodiment.

FIG. 5 is a flow diagram that illustrates the processing of the firewall component in one embodiment. The component is invoked when the firewall receives a packet from the network. In block 510, the firewall receives a packet from the network. In block 520, the component searches a table of rules for any rules that are triggered by the received packet. In decision block 530, if a matching rule was found then the component continues at block 540, else the component continues at block 550. In block 540, the component performs the action indicated by the rule. Rules can contain a variety of actions including accepting the packet, discarding the packet, or logging information about the packet. In block 550, if no rule was found the component delivers the packet. In some embodiments, the component may discard the packet if no specific rule is found that allows the packet to be delivered. The component then completes.

FIG. 6 is a table showing a set of firewall rules in one embodiment. The table 610 contains two entries 620 and 630. Each entry has a condition 640 that specifies the condition that triggers the operation of the rule, and an action 650 that should be performed when the rule is triggered. The first rule 620 specifies a condition 640 that indicates that the rule should be triggered when a packet arrives with a destination port equal to 80. The first rule 620 specifies an action 650 indicating that the packet should be discarded. The second rule 630 is the type of rule added by the monitoring tool to discover the actions being taken by the firewall. The second rule 630 contains the same condition as the first rule 620, but the action 650 specifies that when the condition occurs the firewall should log an event that contains the process ID of the process making the request, the filter ID that corresponds to the policy that created the rule, and the source address contained within the packet.

From the foregoing, it will be appreciated that specific embodiments of the unified diagnostics system have been described herein for purposes of illustration, but that various modifications may be made without deviating from the spirit and scope of the invention. For example, although event sources have been described in terms of logs, events may be stored in memory, in a text file, in an event log provided by the operating system, or in any other location where the monitoring tool can enumerate events or retrieve information. Accordingly, the invention is not limited except as by the appended claims.

We claim:

1. A system for identifying events relating to a network incident, comprising:

- a policy store that provides network policies that include an Internet Protocol Security (IPSec) policy and a firewall policy, each policy comprising rules, each rule including a condition and an action, the network policies being stored using a common schema, the actions of the rules including an action to generate a policy enforcement event notification;
- a memory storing computer-executable instructions of
  - a filter generator for generating filters from the network policies, the filters with filter conditions for triggering when a network policy should be applied to a network event;
  - a policy engine that receives an indication that a filter was triggered for a network event, identifies applicable rules whose conditions are satisfied by the network event, and performs the actions of the applicable rules including generating a policy enforcement event notification;
  - a network layer including:
    - a firewall component that applies the filters generated by the filter generator to a firewall event, invokes the policy engine to enforce the firewall policy for the firewall event, and generates firewall event notifications for policy enforcement events;
    - an IPSec component that enforces the IPSec policies provided by the policy store and generates IPSec event notifications for policy enforcement events;
- a notification queue for storing policy enforcement event notifications, firewall event notifications, and IPSec event notifications;
- a monitoring tool that monitors event notifications generated by the firewall component, the IPSec component, and the policy engine and when the network incident occurs, identifies from the notification queue, firewall events, IPSec events, and policy enforcement events related to the network incident; and
- a processor for executing the computer-executable instructions stored in the memory.

2. The system of claim 1 wherein the policy store is located on a different computer system than the firewall component.

3. The system of claim 1 wherein the monitoring tool can monitor event notifications generated by sources other than the firewall component and the IPSec component.

4. The system of claim 3 wherein one source is an event log provided by the operating system of a computer system.

5. The system of claim 3 wherein one source is a network device located on a different computer system than the network component.

6. The system of claim 3 wherein the monitoring tool uses a publisher/subscriber model to monitor events.

7. The system of claim 1 wherein the monitoring tool includes a set of filters that specify event notifications that are relevant and event notifications that should be ignored.

8. A method in a computer system with a memory and a processor for identifying the cause of a network incident, comprising:

providing network policies that include an Internet Protocol Security (IPSec) policy and a firewall policy, each policy comprising rules, each rule including a condition and an action, the network policies being stored using a common schema, the actions of the rules including an action to generate a policy enforcement event notification;

generating by the computer system filters from the network policies, the filters with filter conditions for triggering when a network policy should be applied to a network event providing by the computer system a notification queue for storing policy enforcement event notifications, firewall event notifications, and IPSec event notifications, the firewall event notifications being generated by a firewall component that invokes a policy engine to enforce the firewall policy for a firewall event that results in a filter being triggered, the IPSec notifications being generated by a IPSec component that enforces the IPSec policy, and the policy enforcement event notifications being generated by the policy engine that identifies applicable rules whose conditions are satisfied and performs the actions of the applicable rules including generating a policy enforcement event notification;

retrieving from the notification queue a first record indicating that a IPSec event occurred;

retrieving from the notification queue a second record indicating that a firewall event occurred;

retrieving from the notification queue a third record indicating that a policy enforcement event occurred;

correlating by the computer system the first, second, and third records as related to a single network incident; and reporting a network incident report containing information from the first, second, and third records.

9. The method of claim 8 wherein the first record represents a certificate failure event.

10. The method of claim 8 wherein the second record represents a packet discard event.

11. The method of claim 8 wherein reporting a network incident record includes resolving identifiers contained within the first and second records into human-readable text descriptions.

12. The method of claim 8 wherein the first and second records are correlated using a fuzzy matching technique.

13. The method of claim 8 wherein the first and second records are correlated using identifiers within the events.

14. The method of claim 8 wherein the first and second events are correlated by proximity of occurrence in time.

15. A computer-readable storage medium containing instructions for identifying events relating to a network incident, by a method comprising:

providing network policies that include an Internet Protocol Security (IPSec) policy and a firewall policy, each policy comprising rules, each rule including a condition and an action, the network policies being stored using a common schema, the actions of the rules including an action to generate a policy enforcement event notification;

generating filters from the network policies, the filters with filter conditions for triggering when a network policy should be applied to a network event providing a notification queue for storing policy enforcement event notifications, firewall event notifications, and IPSec event notifications, the firewall event notifications being generated by a firewall component that invokes a policy engine to enforce the firewall policy for a firewall event that results in a filter being triggered, the IPSec notifications being generated by a IPSec component that enforces IPSec policy, and the policy enforcement event notifications being generated by the policy engine that identifies applicable rules whose conditions are satisfied and performs the actions of the applicable rules including generating a policy enforcement event notification;

retrieving from the notification queue a first event notification indicating that a IPSec event occurred;

retrieving from the notification queue a second event notification indicating that a firewall event occurred;

retrieving from the notification queue a third event notification indicating that a policy enforcement event occurred;

correlating the first, second, and third event notifications as related to a single network incident; and generating a network incident report containing information from the first, second, and third event notifications.

* * * * *